United States Patent
Mashey

(10) Patent No.: US 6,443,699 B1
(45) Date of Patent: Sep. 3, 2002

(54) BUSHING RETENTION SYSTEM FOR THERMAL MEDIUM COOLING DELIVERY TUBES IN A GAS TURBINE ROTOR

(75) Inventor: Thomas Charles Mashey, Coxsackie, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/617,508

(22) Filed: Jul. 14, 2000

Related U.S. Application Data

(63) Continuation of application No. 09/304,202, filed on May 3, 1999.

(51) Int. Cl.$^7$ .............................. F01D 5/08; B63H 1/00
(52) U.S. Cl. ...................................... 416/198 A; 416/95
(58) Field of Search ................................ 416/95, 96 R, 416/198 R, 198 A; 415/175

(56) References Cited

U.S. PATENT DOCUMENTS

| | | | | |
|---|---|---|---|---|
| 3,134,535 | A | * 5/1964 | Maier | 416/198 A X |
| 3,163,396 | A | * 12/1964 | Csillag | 416/95 |
| 3,824,030 | A | * 7/1974 | DeFeo | 416/198 A X |
| 4,396,197 | A | * 8/1983 | Shimizu | 415/175 X |
| 4,880,354 | A | * 11/1989 | Teranishi et al. | 416/95 |
| 5,558,496 | A | * 9/1996 | Woodmansee et al. | 416/95 |
| 5,593,274 | A | | 1/1997 | Carreno et al. | 415/115 |
| 5,695,319 | A | | 12/1997 | Matsumoto et al. | 416/95 |
| 6,146,090 | A | * 11/2000 | Schmidt | 416/198 A X |
| 6,162,018 | A | * 12/2000 | Beck et al. | 416/96 R |
| 6,190,127 | B1 | * 2/2001 | Schmidt | 416/95 |

FOREIGN PATENT DOCUMENTS

DE  1197900  8/1965

OTHER PUBLICATIONS

"39$^{th}$ GE Turbine State–of–the–Art Technology Seminar", Tab 1, ""F" Technology –the First Half–Million Operating Hours", H.E. Miller, Aug. 1996.
"39th GE Turbine State–of–the–Art Technology Seminar", Tab 2, "GE Heavy–Duty Gas Turbine Performance Characteristics", F. J. Brooks, Aug. 1996.
"39th GE Turbine State–of–the–Art Technology Seminar", Tab 3, "9EC 50Hz 170–MW Class Gas Turbine", A. S. Arrao, Aug. 1996.
"39th GE Turbine State–of–the–Art Technology Seminar", Tab 4, "MWS6001FA –An Advanced–Technology 70–MW Class 50/60 Hz Gas Turbine", Ramachandran et al., Aug. 1996.
"39th GE Turbine State–of–the–Art Technology Seminar", Tab 5, "Turbomachinery Technology Advances at Nuovo Pignone", Benvenuti et al., Aug. 1996.

(List continued on next page.)

*Primary Examiner*—John E. Ryznic
(74) *Attorney, Agent, or Firm*—Nixon & Vanderhye

(57) ABSTRACT

Bushings are provided in counterbores for wheels and spacers for supporting thermal medium cooling tubes extending axially adjacent the rim of the gas turbine rotor. The retention system includes a retaining ring disposed in a groove adjacent an end face of the bushing and which retaining ring projects radially inwardly to prevent axial movement of the bushing in one direction. The retention ring has a plurality of circumferentially spaced tabs along its inner diameter whereby the ring is supported by the lands of the tube maintaining its bushing retention function, notwithstanding operation in high centrifugal fields and rotation of the ring in the groove into other circular orientations.

14 Claims, 3 Drawing Sheets

OTHER PUBLICATIONS

"39th GE Turbine State–of–the–Art Technology Seminar", Tab 6, "GE Aeroderivative Gas Turbines –Design and Operating Features", M.W. Horner, Aug. 1996.

"39th GE Turbine State–of–the–Art Technology Seminar", Tab 7, "Advance Gas Turbine Materials and Coatings", P.W. Schilke, Aug. 1996.

"39th GE Turbine State–of–the–Art Technology Seminar", Tab 8, "Dry Low $NO_x$ Combustion Systems for GE Heavy–Duty Turbines", L. B. Davis, Aug. 1996.

"39th GE Turbine State–of–the–Art Technology Seminar", Tab 9, "GE Gas Turbine Combustion Flexibility", M. A. Davi, Aug. 1996.

"39th GE Turbine State–of–the–Art Technology Seminar", Tab 10, "Gas Fuel Clean–Up System Design Considerations for GE Heavy–Duty Gas Turbines", C. Wilkes, Aug. 1996.

"39th GE Turbine State–of–the–Art Technology Seminar", Tab 11, "Integrated Control Systems for Advanced Combined Cycles", Chu et al., Aug. 1996.

"39th GE Turbine State–of–the–Art Technology Seminar", Tab 12, "Power Systems for the 21st Century "H" Gas Turbine Combined Cycles", Paul et al., Aug. 1996.

"39th GE Turbine State–of–the–Art Technology Seminar", Tab 13, "Clean Coal and Heavy Oil Technologies for Gas Turbines", D. M. Todd, Aug. 1996.

"39th GE Turbine State–of–the–Art Technology Seminar", Tab 14, "Gas Turbine Conversions, Modifications and Uprates Technology", Stuck et al., Aug. 1996.

"39th GE Turbine State–of–the–Art Technology Seminar", Tab 15, "Performance and Reliability Improvements for Heavy–Duty Gas Turbines,"J. R. Johnston, Aug. 1996.

"39th GE Turbine State–of–the–Art Technology Seminar", Tab 16, "Gas Turbine Repair Technology", Crimi et al., Aug. 1996.

"39th GE Turbine State–of–the–Art Technology Seminar", Tab 17, "Heavy Duty Turbine Operating & Maintenance Considerations", R. F. Hoeft, Aug. 1996.

"39th GE Turbine State–of–the–Art Technology Seminar", Tab 18, "Gas Turbine Performance Monitoring and Testing", Schmitt et al., Aug. 1996.

"39th GE Turbine State–of–the–Art Technology Seminar", Tab 19, "Monitoring Service Delivery System and Diagnostics", Madej et al., Aug. 1996.

"39th GE Turbine State–of–the–Art Technology Seminar", Tab 20, "Steam Turbines for Large Power Applications", Reinker et al., Aug. 1996.

"39th GE Turbine State–of–the–Art Technology Seminar", Tab 21, "Steam Turbines for Ultrasupercritical Power Plants", Retzlaff et al., Aug. 1996.

"39th GE Turbine State–of–the–Art Technology Seminar", Tab 22, "Steam Turbine Sustained Efficiency", P. Schofield, Aug. 1996.

"39th GE Turbine State–of–the–Art Technology Seminar", Tab 23, "Recent Advances in Steam Turbines for Industrial and Cogeneration Applications", Leger et al., Aug. 1996.

"39th GE Turbine State–of–the–Art Technology Seminar", Tab 24, "Mechanical Drive Steam Turbines", D. R. Leger, Aug. 1996.

"39th GE Turbine State–of–the–Art Technology Seminar", Tab 25, "Steam Turbines for STAG™ Combined–Cycle Power Systems", M. Boss, Aug. 1996.

"39th GE Turbine State–of–the–Art Technology Seminar", Tab 26, "Cogeneration Application Considerations", Fisk et al., Aug. 1996.

"39th GE Turbine State–of–the–Art Technology Seminar", Tab 27, "Performance and Economic Considerations of Repowering Steam Power Plants", Stoll et al., Aug. 1996.

"39th GE Turbine State–of–the–Art Technology Seminar", Tab 28, "High–Power–Density™ Steam Turbine Design Evolution", J. H. Moore, Aug. 1996.

"39th GE Turbine State–of–the–Art Technology Seminar", Tab 29, "Advances in Steam Path Technologies", Cofer, IV, et al., Aug. 1996.

"39th GE Turbine State–of–the–Art Technology Seminar", Tab 30, "Upgradable Opportunities for Steam Turbines", D. R. Dreier, Jr., Aug. 1996.

"39th GE Turbine State–of–the–Art Technology Seminar", Tab 31, "Uprate Options for Industrial Turbines", R. C. Beck, Aug. 1996.

"39th GE Turbine State–of–the–Art Technology Seminar", Tab 32, "Thermal Performance Evaluation and Assessment of Steam Turbine Units", P. Albert, Aug. 1996.

"39th GE Turbine State–of–the–Art Technology Seminar", Tab 33, "Advances in Welding Repair Technology", J. F. Nolan, Aug. 1996.

"39th GE Turbine State–of–the–Art Technology Seminar", Tab 34, "Operation and Maintenance Strategies to Enhance Plant Profitability", MacGillivray et al., Aug. 1996.

"39th GE Turbine State–of–the–Art Technology Seminar", Tab 35, "Generator Insitu Inspections", D. Stanton.

"39th GE Turbine State–of–the–Art Technology Seminar", Tab 36, "Generator Upgrade and Rewind", Halpern et al., Aug. 1996.

"39th GE Turbine State–of–the–Art Technology Seminar", Tab 37, "GE Combined Cycle Product Line and Performance", Chase, et al., Aug. 1996.

"39th GE Turbine State–of–the–Art Technology Seminar", Tab 38, "GE Combined Cycle Experience", Maslak et al., Aug. 1996.

"39th GE Turbine State–of–the–Art Technology Seminar", Tab 39, "Single–Shaft Combined Cycle Power Generation Systems", Tomlinson et al., Aug. 1996.

"Advanced Turbine System Program –Conceptual Design and Product Development", Annual Report, Sep. 1, 1994 — Aug. 31, 1995.

"Advanced Turbine Systems (ATS Program) Conceptual Design and Product Development", Final Technical Progress Report, vol. 2–Industrial Machine, Mar. 31, 1997, Morgantown, WV.

"Advanced Turbine Systems (ATS Program), Conceptual Design and Product Development", Final Technical Progress Report, Aug. 31, 1996, Morgantown, WV.

"Advanced Turbine Systems (ATS Program) Conceptual Design and Product Development", Yearly Technical Progress Report, Reporting Period: Aug. 25, 1993—Aug. 31, 1994.

"Advanced Turbine Systems" Annual Program Review, Preprints, Nov. 2–4, 1998, Washington, D.C. U.S. Department of Energy, Office of Industrial Technologies Federal Energy Technology Center.

"ATS Conference" Oct. 28, 1999, Slide Presentation.

"Baglan Bay Launch Site", various articles relating to Baglan Energy Park.

"Baglan Energy Park", Brochure.

"Commercialization", Del Williamson, Present, Global Sales, May 8, 1998.

"Environmental, Health and Safety Assessment: ATS 7H Program (Phase 3R) Test Activities at the GE Power Systems Gas Turbine Manufacturing Facility, Greenville, SC", Document #1753, Feb. 1998, Publication Date: Nov. 17, 1998, Report Numbers DE–FC21–95MC31176—11.

"Exhibit panels used at 1995 product introduction at PowerGen Europe".

"Extensive Testing Program Validates High Efficiency, reliability of GE's Advanced "H" Gas Turbine Technology", Press Information, Press Release, 96–NR14, Jun. 26, 1996, H Technology Tests/pp. 1–4.

"Extensive Testing Program Validates High Efficiency, Reliability of GE's Advanced "H" Gas Turbine Technology, GE Introduces Advanced Gas Turbine Technology Platform: First to Reach 60% Combined–Cycle Power Plant Efficiency", Press Information, Press Release, Power–Gen Europe '95, 95–NRR15, Advanced Technology Introduction/pp. 1–6.

"Gas, Steam Turbine Work as Single Unit in GE's Advanced H Technology Combined–Cycle System", Press Information, Press Release, 95–NR18, May 16, 1995, Advanced Technology Introduction/pp. 1–3.

"GE Breaks 60% Net Efficiency Barrier" paper, 4 pages.

"GE Businesses Share Technologies and Experts to Develop State–Of–The–Art Products", Press Information, Press Release 95–NR10, May 16, 1995, GE Technology Transfer/pp. 1–3.

"General Electric ATS Program Technical Review, Phase 2 Activities", T. Chance et al., pp. 1–4.

"General Electric's DOE/ATS H Gas Turbine Development" Advanced Turbine Systems Annual Review Meeting, Nov. 7–8, 1996, Washington, D.C., Publication Release.

"H Technology Commercialization", 1998 MarComm Activity Recommendation, Mar., 1998.

"H Technology", Jon Ebacher, VP, Power Gen Technology, May 8, 1998.

"H Testing Process", Jon Ebacher, VP, Power Gen Technology, May 8, 1998.

"Heavy–Duty & Aeroderivative Products" Gas Turbines, Brochure, 1998.

"MS7001H/MS9001H Gas Turbine, gepower.com website for PowerGen Europe" Jun. 1–3 going public Jun. 15, (1995).

"New Steam Cooling System is a Key to 60% Efficiency For GE "H" Technology Combined–Cycle Systems", Press Information, Press Release, 95–NRR16, May 16, 1995, H Technology/pp. 1–3.

"Overview of GE's H Gas Turbine Combined Cycle", Jul. 1, 1995 to Dec. 31, 1997.

"Power Systems for the $21^{st}$ Century –"H" Gas Turbine Combined Cycles", Thomas C. Paul et al., Report,.

"Power–Gen '96 Europe", Conference Programme, Budapest, Hungary, Jun. 26–28, 1996.

"Power–Gen International", 1998 Show Guide, Dec. 9–11, 1998, Orange County Convention Center, Orlando, Florida.

"Press Coverage following 1995 product announcement"; various newspaper clippings relating to improved generator.

"Proceedings of the Advanced Turbine Systems Annual Program Review Meeting", vol. I, "Industrial Advanced Turbine Systems Program Overview", D.W. Esbeck, pp. 3–13, Oct., 1995.

"Proceedings of the Advanced Turbine Systems Annual Program Review Meeting", vol. I, "H Gas Turbine Combined Cycle", J. Corman, pp. 14–21, Oct. 1995.

"Proceedings of the Advanced Turbine Systems Annual Program Review Meeting", vol. I, "Overview of Westinghouse's Advanced Turbine Systems Program", Bannister et al., pp. 22–30, Oct. 1995.

"Proceedings of the Advanced Turbine Systems Annual Program Review Meeting", vol. I, "Allison Engine ATS Program Technical Review", D. Mukavetz, pp. 31–42, Oct. 1995.

"Proceedings of the Advanced Turbine Systems Annual Program Review Meeting", vol. I, "Advanced Turbine Systems Program Industrial System Concept Development", S. Gates, pp. 43–63, Oct., 1995.

"Proceedings of the Advanced Turbine Systems Annual Program Review Meeting", vol. I, "Advanced Turbine System Program Phase 2 Cycle Selection", Latcovich, Jr., pp. 64–69, Oct., 1995.

"Proceedings of the Advanced Turbine Systems Annual Program Review Meeting", vol. I, "General Electric ATS Program Technical Review Pahse 2 Activities", Chance et al., pp. 70–74, Oct., 1995.

"Proceedings of the Advanced Turbine Systems Annual Program Review Meeting", vol. I, "Technical Review of Westinghouse's Advanced Turbine Systems Program", Diakunchak et al., pp. 75–86, Oct., 1995.

"Proceedings of the Advanced Turbine Systems Annual Program Review Meeting", vol. I, "Advanced Combustion Turbines and Cycles: An EPRI Perspective", Touchton et al., pp. 87–88, Oct., 1995.

"Proceedings of the Advanced Turbine Systems Annual Program Review Meeting", vol. I, "Advanced Turbine Systems Annual Program Review", William E. Koop, pp. 89–92, Oct., 1995.

"Proceedings of the Advanced Turbine Systems Annual Program Review Meeting", vol. I, "The AGTSR Consortium: An Update", Fant et al., pp. 93–102, Oct., 1995.

"Proceedings of the Advanced Turbine Systems Annual Program Review Meeting", vol. I, "Overview of Allison/AGTSR Interactions", Sy A. Ali, pp. 103–106, Oct., 1995.

"Proceedings of the Advanced Turbine Systems Annual Program Review Meeting", vol. I, "Design Factors for Stable Lean Premix Combustion", Richards et al., pp. 107–113, Oct., 1995.

"Proceedings of the Advanced Turbine Systems Annual Program Review Meeting", vol. I, "Ceramic Stationary as Turbine", M. van Roode, pp. 114–147, Oct., 1995.

"Proceedings of the Advanced Turbine Systems Annual Program Review Meeting", vol. I, "DOE/Allison Ceramic Vane Effort", Wenglarz et al., pp. 148–151, Oct., 1995.

"Proceedings of the Advanced Turbine Systems Annual Program Review Meeting", vol. I, "Materials/Manufacturing Element of the Advanced Turbine Systems Program", Karnitz et al., pp. 152–160, Oct., 1995.

"Proceedings of the Advanced Turbine Systems Annual Program Review Meeting", vol. I, "Land–Based Turbine Casting Initiative", Mueller et al., pp. 161–170, Oct., 1995.

"Proceedings of the Advanced Turbine Systems Annual Program Review Meeting", vol. I, "Turbine Airfoil Manufacturing Technology", Kortovich, pp. 171–181, Oct., 1995.

"Proceedings of the Advanced Turbine Systems Annual Program Review Meeting", vol. I, "Pratt & Whitney Thermal Barrier Coatings", Bornstein et al., pp. 182–193, Oct., 1995.

"Proceedings of the Advanced Turbine Systems Annual Program Review Meeting", vol. I, "Westinhouse Thermal Barrier Coatings", Goedjen et al., pp. 194–199, Oct., 1995.

"Proceedings of the Advanced Turbine Systems Annual Program Review Meeting", vol. I, "High Performance Steam Development", Duffy et al., pp. 200–220, Oct., 1995.

"Proceedings of the Advanced Turbine Systems Annual Program Review Meeting", vol. II, "Lean Premixed Combustion Stabilized by Radiation Feedback and heterogeneous Catalysis", Dibble et al., pp. 221–232, Oct., 1995.

"Proceedings of the Advanced Turbine Systems Annual Program Review Meeting", vol. II, Rayleigh/Raman/LIF Measurements in a Turbulent Lean Premixed Combustor, Nandula et al. pp. 233–248, Oct., 1995.

"Proceedings of the Advanced Turbine Systems Annual Program Review Meeting", vol. II, "Lean Premixed Flames for Low $No_x$ Combustors", Sojka et al., pp. 249–275, Oct., 1995.

"Proceedings of the Advanced Turbine Systems Annual Program Review Meeting", vol. II, "Functionally Gradient Materials for Thermal Barrier Coatings in Advanced Gas Turbine Systems", Banovic et al., pp. 276–280, Oct., 1995.

"Proceedings of the Advanced Turbine Systems Annual Program Review Meeting", vol. II, "Advanced Turbine Cooling, Heat Transfer, and Aerodynamic Studies", Han et al., pp. 281–309, Oct., 1995.

"Proceedings of the Advanced Turbine Systems Annual Program Review Meeting", vol. II, "Life Prediction of Advanced Materials for Gas Turbine Application", Zamrik et al., pp. 310–327, Oct., 1995.

"Proceedings of the Advanced Turbine Systems Annual Program Review Meeting", vol. II, "Advanced Combustion Technologies for Gas Turbine Power Plants", Vandsburger et al., pp. 328–352, Oct., 1995.

"Proceedings of the Advanced Turbine Systems Annual Program Review Meeting", vol. II, "Combustion Modeling in Advanced Gas Turbine Systems", Smoot et al., pp. 353–370, Oct., 1995.

"Proceedings of the Advanced Turbine Systems Annual Program Review Meeting", vol. II, "Heat Transfer in a Two–Pass Internally Ribbed Turbine Blade Coolant Channel with Cylindrical Vortex Generators", Hibbs et al. pp. 371–390, Oct., 1995.

"Proceedings of the Advanced Turbine Systems Annual Program Review Meeting", vol. II, "Rotational Effects on Turbine Blade Cooling", Govatzidakia et al., pp. 391–392, Oct., 1995.

"Proceedings of the Advanced Turbine Systems Annual Program Review Meeting", vol. II, "Manifold Methods for Methane Combustion", Yang et al., pp. 393–409, Oct., 1995.

"Proceedings of the Advanced Turbine Systems Annual Program Review Meeting", vol. II, "Advanced Multistage Turbine Blade Aerodynamics, Performance, Cooling, and Heat Transfer", Fleeter et al., pp. 410–414, Oct., 1995.

"Proceedings of the Advanced Turbine Systems Annual Program Review Meeting, vol. II", The Role of Reactant Unmixedness, Strain Rate, and Length Scale on Premixed Combustor Performance, Samuelsen et al., pp. 415–422, Oct., 1995.

"Proceedings of the Advanced Turbine Systems Annual Program Review Meeting", vol. II, "Experimental and Computational Studies of Film Cooling With Compound Angle Injection", Goldstein et al., pp. 423–451, Oct., 1995.

"Proceedings of the Advanced Turbine Systems Annual Program Review Meeting", vol. II, "Compatibility of Gas Turbine Materials with Steam Cooling", Desai et al., pp. 452–464, Oct., 1995.

"Proceedings of the Advanced Turbine Systems Annual Program Review Meeting", vol. II, "Use of a Laser–Induced Fluorescence Thermal Imaging System for Film Cooling Heat Transfer Measurement", M. K. Chyu, pp. 465–473, Oct., 1995.

"Proceedings of the Advanced Turbine Systems Annual Program Review Meeting", vol. II, Effects of Geometry on Slot–Jet Film Cooling Performance, Hyams et al., pp. 474–496 Oct., 1995.

"Proceedings of the Advanced Turbine Systems Annual Program Review Meeting", vol. II, "Steam as Turbine Blade Coolant: Experimental Data Generation", Wilmsen et al., pp. 497–505, Oct., 1995.

"Proceedings of the Advanced Turbine Systems Annual Program Review Meeting", vol. II, "Combustion Chemical Vapor Deposited Coatings for Thermal Barrier Coating Systems", Hampikian et al., pp. 506–515, Oct., 1995.

"Proceedings of the Advanced Turbine Systems Annual Program Review Meeting", vol. II, "Premixed Burner Experiments: Geometry, Mixing, and Flame Structure Issues", Gupta et al., pp. 516–528, Oct., 1995.

"Proceedings of the Advanced Turbine Systems Annual Program Review Meeting", vol. II, "Intercooler Flow Path for Gas Turbines: CFD Design and Experiments", Agrawal et al., pp. 529–538, Oct., 1995.

"Proceedings of the Advanced Turbine Systems Annual Program Review Meeting", vol. II, "Bond Strength and Stress Measurements in Thermal Barrier Coatings", Gell et al., pp. 539–549, Oct., 1995.

"Proceedings of the Advanced Turbine Systems Annual Program Review Meeting", vol. II, "Active Control of Combustion Instabilities in Low $NO_x$ Gas Turbines", Zinn et al., pp. 550–551, Oct., 1995.

"Proceedings of the Advanced Turbine Systems Annual Program Review Meeting", vol. II, "Combustion Instability Modeling and Analysis", Santoro et al., pp. 552–559, Oct., 1995.

"Proceedings of the Advanced Turbine Systems Annual Program Review Meeting", vol. II, "Flow and Heat Transfer in Gas Turbine Disk Cavities Subject to Nonuniform External Pressure Field", Roy et al., pp. 560–565, Oct., 1995.

"Proceedings of the Advanced Turbine Systems Annual Program Review Meeting", vol. II, "Heat Pipe Turbine Vane Cooling", Langston et al., pp. 566–572, Oct., 1995.

"Proceedings of the Advanced Turbine Systems Annual Program Review Meeting", vol. II, "Improved Modeling Techniques for Turbomachinery Flow Fields", Lakshminarayana et al., pp. 573–581, Oct., 1995.

"Proceedings of the Advanced Turbine Systems Annual Program Review Meeting", vol. II, "Advanced 3D Inverse Method for Designing Turbomachine Blades", T. Dang, p. 582, Oct., 1995.

"Proceedings of the Advanced Turbine Systems Annual Program Review Meeting", "ATS and the Industries of the Future", Denise Swink, p. 1, Nov., 1996.

"Proceedings of the Advanced Turbine Systems Annual Program Review Meeting", "Gas Turbine Association Agenda", William H. Day, pp. 3–16, Nov., 1996.

"Proceedings of the Advanced Turbine Systems Annual Program Review Meeting", "Power Needs in the Chemical Industry", Keith Davidson, pp. 17–26, Nov., 1996.

"Proceedings of the Advanced Turbine Systems Annual Program Review Meeting", "Advanced Turbine Systems Program Overview", David Esbeck, pp. 27–34, Nov., 1996.

"Proceedings of the Advanced Turbine Systems Annual Program Review Meeting", "Westinghouse's Advanced Turbine Systems Program", Gerard McQuiggan, pp. 35–48, Nov., 1996.

"Proceedings of the Advanced Turbine Systems Annual Program Review Meeting", "Overview of GE's H Gas Turbine Combined Cycle", Cook et al., pp. 49–72, Nov., 1996.

"Proceedings of the Advanced Turbine Systems Annual Program Review Meeting", "Allison Advanced Simple Cycle Gas Turbine System", William D. Weisbrod, pp. 73–94, Nov., 1996.

"Proceedings of the Advanced Turbine Systems Annual Program Review Meeting", "The AGTSR Industry–University Consortium", Lawrence P. Golan, pp. 95–110, Nov., 1996.

"Proceedings of the Advanced Turbine Systems Annual Program Review Meeting", "$NO_x$ and CO Emissions Models for Gas–Fired Lean–Premixed Combustion Turbines", A. Mellor, pp. 111–122, Nov., 1996.

"Proceedings of the Advanced Turbine Systems Annual Program Review Meeting", "Methodologies for Active Mixing and Combustion Control", Uri Vandsburger, pp. 123–156, Nov., 1996.

"Proceedings of the Advanced Turbine Systems Annual Program Review Meeting", "Combustion Modeling in Advanced Gas Turbine Systems", Paul O. Hedman, pp. 157–180, Nov., 1997.

"Proceedings of the Advanced Turbine Systems Annual Program Review Meeting", "Manifold Methods for Methane Combustion", Stephen B. Pope, pp. 181–188, Nov., 1996.

"Proceedings of the Advanced Turbine Systems Annual Program Review Meeting", "The Role of Reactant Unmixedness, Strain Rate, and Length Scale on Premixed Combustor Performance", Scott Samuelsen, pp. 189–210, Nov., 1996.

"Proceedings of the Advanced Turbine Systems Annual Program Review Meeting", "Effect of Swirl and Momentum Distribution on Temperature Distribution in Premixed Flames", Ashwani K. Gupta, pp. 211–232, Nov., 1996.

"Proceedings of the Advanced Turbine Systems Annual Program Review Meeting", "Combustion Instability Studies Application to Land–Based Gas Turbine Combustors", Robert J. Santoro, pp. 233–252.

"Proceedings of the Advanced Turbine Systems Annual Program Review Meeting", "Active Control of Combustion Instabilities in Low $NO_x$ Turbines", Ben T. Zinn, pp. 253–264, Nov., 1996.

"Proceedings of the Advanced Turbine Systems Annual Program Review Meeting", "Life Prediction of Advanced Materials for Gas Turbine Application," Sam Y. Zamrik, pp. 265–274, Nov., 1996.

"Proceedings of the Advanced Turbine Systems Annual Program Review Meeting", "Combustion Chemical Vapor Deposited Coatings for Thermal Barrier Coating Systems", W. Brent Carter, pp. 275–290, Nov., 1996.

"Proceedings of the Advanced Turbine Systems Annual Program Review Meeting", "Compatibility of Gas Turbine Materials with Steam Cooling", Vimal Desai, pp. 291–314, Nov., 1996.

"Proceedings of the Advanced Turbine Systems Annual Program Review Meeting", "Bond Strength and Stress Measurements in Thermal Barrier Coatings", Maurice Gell, pp. 315–334, Nov., 1996.

"Proceedings of the Advanced Turbine Systems Annual Program Review Meeting", "Advanced Multistage Turbine Blade Aerodynamics, Performance, Cooling and Heat Transfer", Sanford Fleeter, pp. 335–356, Nov., 1996.

"Proceedings of the Advanced Turbine Systems Annual Program Review Meeting", "Flow Characteristics of an Intercooler System for Power Generating Gas Turbines", Ajay K. Agrawal, pp. 357–370, Nov., 1996.

"Proceedings of the Advanced Turbine Systems Annual Program Review Meeting", "Improved Modeling Techniques for Turbomachinery Flow Fields", B. Lakshiminarayana, pp. 371–392, Nov., 1996.

"Proceedings of the Advanced Turbine Systems Annual Program Review Meeting", "Development of an Advanced 3d & Viscous Aerodynamic Design Method for Turbomachine Components in Utility and Industrial Gas Turbine Applications", Thong Q. Dang, pp. 393–406, Nov., 1996.

"Proceedings of the Advanced Turbine Systems Annual Program Review Meeting", "Advanced Turbine Cooling, Heat Transfer and Aerodynamic Studies", Je–Chin Han, pp. 407–426, Nov., 1996.

"Proceedings of the Advanced Turbine Systems Annual Program Review Meeting", "Heat Transfer in a Two–Pass Internally Ribbed Turbine Blade Coolant Channel with Vortex Generators", S. Acharya, pp. 427–446.

"Proceedings of the Advanced Turbine Systems Annual Program Review Meeting", "Experimental and Computational Studies of Film Cooling with Compound Angle Injection", R. Goldstein, pp. 447–460, Nov., 1996.

"Proceedings of the Advanced Turbine Systems Annual Program Review Meeting", "Study of Endwall Film Cooling with a Gap Leakage Using a Thermographic Phosphor Fluorescence Imaging System", Mingking K. Chyu, pp. 461–471, Nov., 1996.

"Proceedings of the Advanced Turbine Systems Annual Program Review Meeting", "Steam as a Turbine Blade Coolant: External Side Heat Transfer", Abraham Engeda, pp. 471–482, Nov., 1996.

"Proceedings of the Advanced Turbine Systems Annual Program Review Meeting", "Flow and Heat Transfer in Gas Turbine Disk Cavities Subject to Nonuniform External Pressure Field", Ramendra Roy, pp. 483–498, Nov., 1996.

"Proceedings of the Advanced Turbine Systems Annual Program Review Meeting", "Closed–Loop Mist/Steam Cooling for Advanced Turbine Systems", Ting Wang, pp. 499–512, Nov., 1996.

"Proceedings of the Advanced Turbine Systems Annual Program Review Meeting", "Heat Pipe Turbine Vane Cooling", Langston et al., pp. 513–534, Nov., 1996.

"Proceedings of the Advanced Turbine Systems Annual Program Review Meeting", "EPRI's Combustion Turbine Program: Status and Future Directions", Arthur Cohn, pp. 535–552 Nov., 1996.

"Proceedings of the Advanced Turbine Systems Annual Program Review Meeting", "ATS Materials Support", Michael Karnitz, pp. 553–576, Nov., 1996.

"Proceedings of the Advanced Turbine Systems Annual Program Review Meeting", "Land Based Turbine Casting Initiative", Boyd A. Mueller, pp. 577–592, Nov., 1996.

"Proceedings of the Advanced Turbine Systems Annual Program Review Meeting", "Turbine Airfoil Manufacturing Technology", Charles S. Kortovich, pp. 593–622, Nov., 1996.

"Proceedings of the Advanced Turbine Systems Annual Program Review Meeting", "Hot Corrosion Testing of TBS's", Norman Bornstein, pp. 623–631, Nov., 1996.

"Proceedings of the Advanced Turbine Systems Annual Program Review Meeting", "Ceramic Stationary Gas Turbine", Mark van Roode, pp. 633–658, Nov., 1996.

"Proceedings of the Advanced Turbine Systems Annual Program Review Meeting", "Western European Status of Ceramics for Gas Turbines", Tibor Bornemisza, pp. 659–670, Nov., 1996.

"Proceedings of the Advanced Turbine Systems Annual Program Review Meeting", "Status of Ceramic Gas Turbines in Russia", Mark van Roode, pp. 671, Nov., 1996.

"Status Report: The U.S. Department of Energy's Advanced Turbine systems Program", facsimile dated Nov. 7, 1996.

"Testing Program Results Validate GE's H Gas Turbine — High Efficiency, Low Cost of Electricity and Low Emissions", Roger Schonewald and Patrick Marolda, (no date available),.

"Testing Program Results Validate GE's H Gas Turbine — High Efficiency, Low Cost of Electricity and Low Emissions", Slide Presentation — working draft, (no date available).

"The Next Step In H . . . For Low Cost Per kW–Hour Power Generation", LP–1 PGE '98.

"Utility Advanced Turbine System (ATS) Technology Readiness Testing and Pre–Commercialization Demonstration", Document #486040, Oct. 1–Dec. 31, 1996, Publication Date, Jun. 1, 1997, Report Numbers: DOE/MC/31176—5628,.

"Utility Advanced Turbine System (ATS) Technology Readiness Testing — Phase 3", Document #666274, Oct. 1, 1996–Sep. 30, 1997, Publication Date, Dec. 31, 1997, Report Numbers: DOE/MC/31176—10.

"Utility Advanced Turbine System (ATS) Technology Readiness Testing and Pre–Commercial Demonstration, Phase 3", Document #486029, Oct. 1–Dec. 31, 1995, Publication Date, May 1, 1997, Report Numbers: DOE/MC/31176—5340.

"Utility Advanced Turbine System (ATS) Technology Readiness Testing and Pre–Commercial Demonstration — Phase 3", Document #486132, Apr. 1–Jun. 30, 1976, Publication Date, Dec. 31, 1996, Report Numbers: DOE/MC/31176—5660.

"Utility Advanced Turbine System (ATS) Technology Readiness Testing and Pre–Commercial Demonstration — Phase 3", Document #587906, Jul. 1–Sep. 30, 1995, Publication Date, Dec. 31, 1995, Report Numbers: DOE/MC/31176—5339.

"Utility Advanced Turbine System (ATS) Technology Readiness Testing and Pre–Commercial Demonstration" Document #666277, Apr. 1–Jun. 30, 1997, Publication Date, Dec. 31, 1997, Report Numbers: DOE/MC/31176—8.

"Utility Advanced Turbine System (ATS) Technology Readiness Testing and Pre–Commercialization Demonstration" Jan. 1–Mar. 31, 1996, DOE/MC/31176—5338.

"Utility Advanced Turbine System (ATS) Technology Readiness Testing: Phase 3R", Document #756552, Apr. 1–Jun. 30, 1999, Publication Date, Sep. 1, 1999, Report Numbers: DE—FC21–95MC31176-23.

"Utility Advanced Turbine System (ATS) Technology Readiness Testing.", Document #656823, Jan. 1–Mar. 31, 1998, Publication Date, Aug. 1, 1998, Report Numbers: DOE/MC/31176-17.

"Utility Advanced Turbine Systems (ATS) Technology Readiness Testing and Pre–Commercial Demonstration", Annual Technical Progress Report, Reporting Period: Jul. 1, 1995—Sep. 30, 1996.

"Utility Advanced Turbine Systems (ATS) Technology Readiness Testing", Phase 3R, Annual Technical Progress Report, Reporting Period: Oct. 1, 1997—Sep. 30, 1998.

"Utility Advanced Turbine Systems (ATS) Technology Readiness Testing", Document #750405, Oct. 1–Dec. 30, 1998, Publication Date: May, 1, 1999, Report Numbers: DE–FC21–95MC31176-20.

"Utility Advanced Turbine Systems (ATS) Technology Readiness Testing", Document #1348, Apr. 1–Jun. 29, 1998, Publication Date: Oct. 29, 1998, Report Numbers DE–FC21–95MC31176—18.

"Utility Advanced Turbine Systems (ATS) Technology Readiness Testing–Phase 3", Annual Technical Progress Report, Reporting Period: Oct. 1, 1996 –Sep. 30, 1997.

"Utility Advanced Turbine Systems (ATS) Technology Readiness Testing and Pre–Commercial Demonstration", Quarterly Report, Jan. 1–Mar. 31, 1997, Document #666275, Report Numbers: DOE/MC/31176-07.

"Proceedings of the 1997 Advanced Turbine Systems", Annual Program Review Meeting, Oct. 28–29, 1997.

* cited by examiner

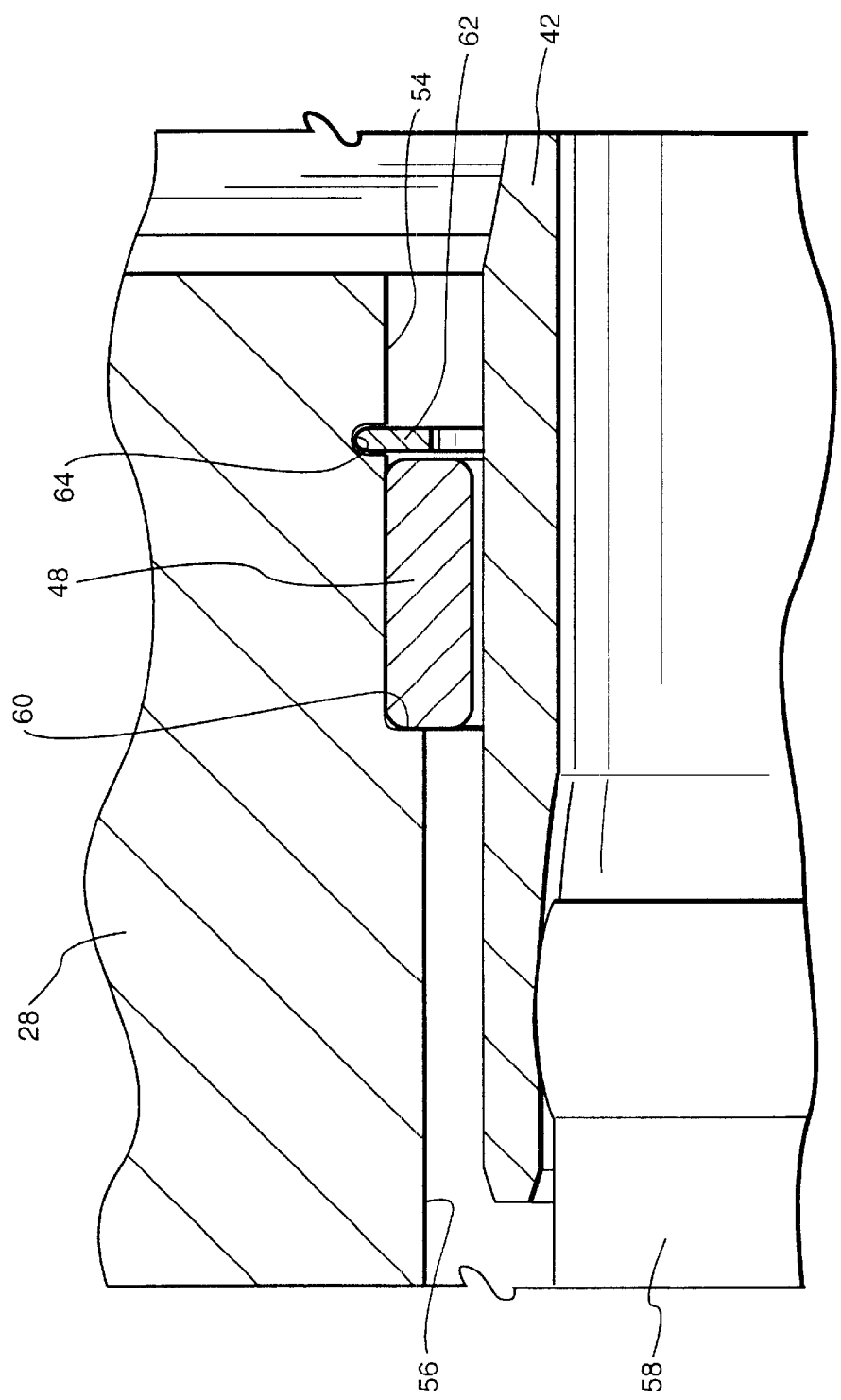

BUSHING RETENTION SYSTEM FOR THERMAL MEDIUM COOLING DELIVERY TUBES IN A GAS TURBINE ROTOR

RELATED APPLICATIONS

This application is a continuation of application Ser. No. 09/304,202, filed May 3, 1999, the disclosure of which is incorporated herein by reference.

This invention was made with Government support under Contract No. DE-FC21-95MC31176 awarded by the Department of Energy. The Government has certain rights in this invention.

TECHNICAL FIELD

The present invention relates to gas turbines having rotational components cooled by a thermal medium flowing in axially extending supply and return tubes within and adjacent the rim of the rotor and particularly relates to retention rings for retaining the bushings about the thermal medium carrying tubes against axial displacement.

BACKGROUND OF THE INVENTION

In an advanced gas turbine design of the assignee of the present application, a closed cooling circuit is provided for supplying a thermal medium, e.g., cooling steam, generally in an axial direction along the rim of the rotor to turbine buckets to cool the buckets and for returning the spent thermal medium in an opposite, generally axial direction for flow from the rotor, for example, to the steam turbines of a combined cycle system. Generally, in that design, cooling steam is supplied via an axial bore tube assembly, radially outwardly extending tubes and a plurality of axially extending tubes along the rims of the wheels and spacers for supplying steam to the buckets. Spent cooling steam is returned from the buckets through additional axially extending return tubes, radially inwardly extending tubes and the central bore of the bore tube assembly. The axially extending supply and return tubes adjacent the rotor rim are fixed at their aft ends and grow thermally in an axial direction relative to tube-carrying bushings in the wheels and spacers upon turbine startup. Upon turbine shutdown, the tubes thermally contract in an axial direction. There has developed a need for a bushing retention system which will prevent dislodgement of the steam tube bushings as a result of axial thermal growth of the tubes, as well as having the capability to perform their retention function in a very substantial transverse high centrifugal field.

BRIEF SUMMARY OF THE INVENTION

In accordance with a preferred embodiment of the present invention, there is provided a bushing retention system for preventing displacement of the bushings in an axial direction during turbine operation and having the capability of operating in a high centrifugal field. It will be appreciated that each bushing comprises an annular member disposed in a counterbore formed in the openings through the wheel and spacer which receive the steam delivery and return tubes. The inner diameter of the bushing is less than the diameter of the openings through the wheels and spacers and the interior surface of the bushing engages lands formed on the tubes to support the tubes in the openings. An axial face of the bushing engages a shoulder or base of the counterbore, preventing axial movement of the bushing toward that face. To preclude axial movement of the bushing in the opposite axial direction, the retention system hereof includes a retainer ring for reception in an annular groove of the counterbore at an axial location beyond the adjacent face of the bushing. The retention ring is a split ring, i.e., having a circumferential extent terminating in ends spaced from one another which enables reduction of the outer diameter of the ring to locate the ring in the groove. Once located, the ring projects radially inwardly of the counterbore to afford a stop for the bushing, preventing dislodgement of the bushing in an axial direction. The lands of the tubes support the ring in the high centrifugal field which otherwise tends to drive the ring out of the groove. Particularly, a plurality of circumferentially spaced tabs project radially inwardly from the inner diameter of each ring and preferably have arcuate faces for engaging the tube lands. In this manner, each ring remains sufficiently in the groove, notwithstanding high centrifugal forces, to continue its function of preventing dislodgement of the bushings. Further, the width of the ring in a radial direction decreases in directions circumferentially toward the ends of the ring. This enables the use of a tool inserted into openings at the ends of the rings to readily and easily reduce the diameter of the ring for subsequent expansion and installation in the groove.

In a preferred embodiment according to the present invention, there is provided a bushing retention system in a gas turbine, comprising a gas turbine rotor having a plurality of axially aligned wheels and spacers, a plurality of axially aligned openings through the wheels and spacers with one of the wheels and spacers having counterbores in the openings, a plurality of tubes extending through the openings in the wheels and spacers at circumferentially spaced locations about the rotor for flowing a thermal medium, each counterbore having a radial extending groove thereabout, a bushing in each counterbore of the one wheel and spacer for supporting the tube therein, a retainer ring in each counterbore groove and projecting radially inwardly sufficiently to prevent movement of the bushing in one axial direction, each ring having a circumferential extent terminating in ends spaced from one another enabling reduction of the outer diameter of the ring to locate the ring in the groove, the ring having radial inward tabs for engaging the tube when the ring is subject to substantial centrifugal forces upon rotation of the rotor to maintain the ring within the groove and prevent axial displacement of the bushing in one axial direction.

BRIEF DESCRIPTION OF THE DRAWINGS

FIG. 2 is an fragmentary cross-sectional view illustrating a preferred form of an axial retention system hereof;

DETAILED DESCRIPTION OF THE INVENTION

Figure 1:
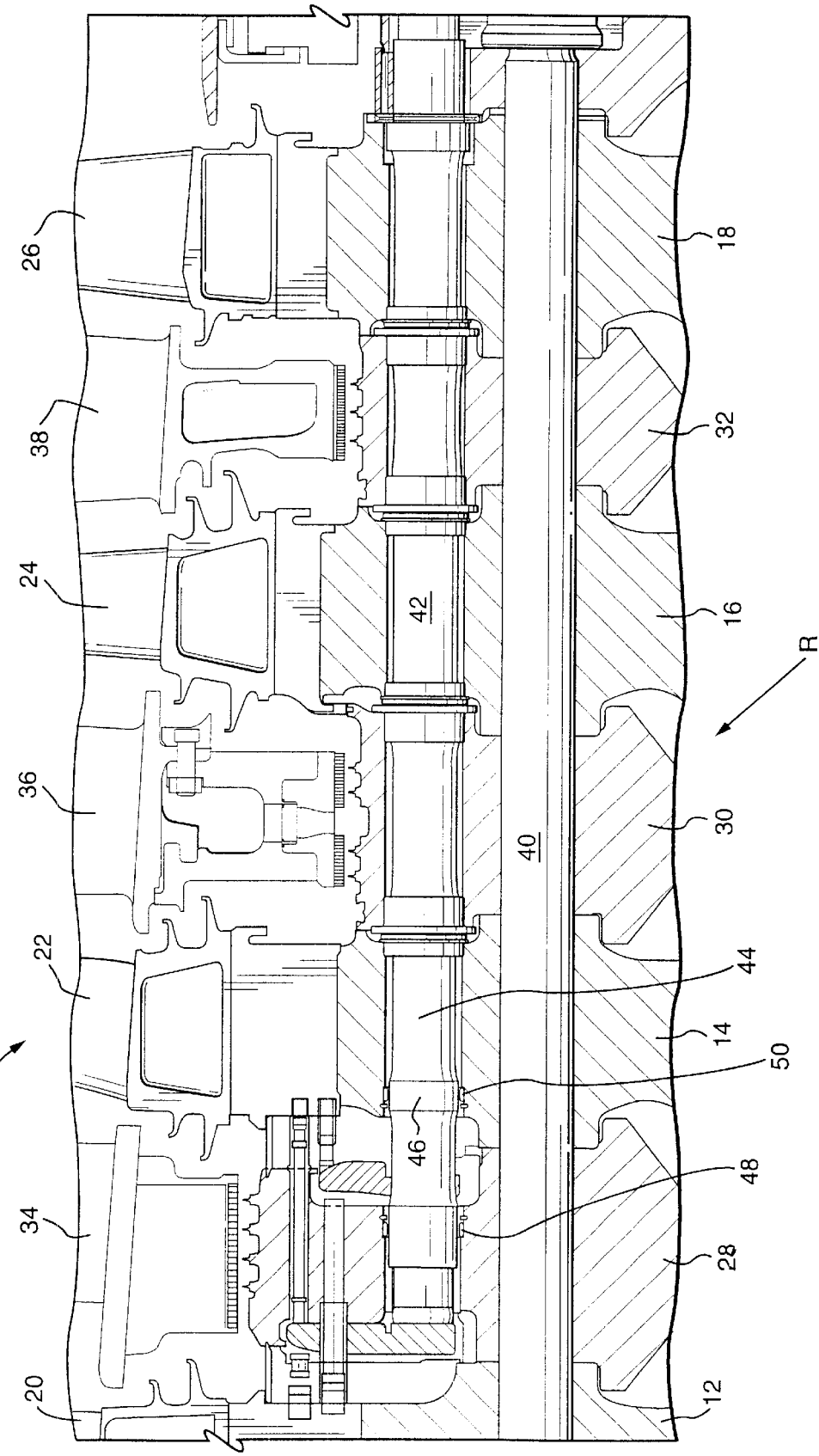
FIG. 1 is a fragmentary cross-sectional view of a portion of the turbine section of a gas turbine rotor having an axial retention system in accordance with the present invention.

Referring to FIG. 1, there is illustrated a turbine section, generally designated 10, of a gas turbine rotor, generally designated R. Rotor R includes in the present example a number of stages, represented by wheels 12, 14, 16 and 18 carrying a plurality of circumferentially spaced buckets or blades 20, 22, 24 and 26, respectively. The wheels are arranged alternately between spacers 28, 30 and 32. The outer rims of spacers 28, 30 and 32 lie in radial registration with a plurality of stator blades or nozzles 34, 36 and 38, respectively, with a first set of nozzles, not shown, lying forwardly of the buckets 20. Consequently, it will be appreciated that a four-stage turbine is illustrated, at least in part, wherein the first stage comprises nozzles, not shown, and buckets 20; the second stage, nozzles 34 and buckets 22; the third stage, nozzles 36 and buckets 24; and the fourth and final stage, in this representative example, of nozzles 38 and buckets 26. Fewer or more stages may be provided. As is conventional, rotor wheels and spacers are secured one to the other by a plurality of circumferentially spaced bolts 40 passing through aligned openings in the wheels and spacers. It will be appreciated that the nozzles and buckets lie in a hot gas path of the turbine section and the energy of the hot gases of combustion are imparted to the buckets to rotate the rotor.

At least one, and preferably both of the sets of buckets 20 and 22 of the first two stages are provided with a thermal medium for cooling the buckets, the thermal medium preferably being cooling steam. The cooling steam is provided in a plurality of circumferentially spaced tubes extending axially through the aligned wheels and spacers adjacent the rim of the rotor. Circumferentially spaced return tubes extend axially adjacent the rim of the rotor for returning spent cooling steam from the cooled buckets to a bore tube assembly, not shown. Only a return tube 42 is illustrated in FIG. 1, the supply tubes and remaining return tubes being substantially similar. The retention system of the present invention applies equally to the supply and return tubes and will be described with respect to the illustrated return tube 42. Each of the tubes includes an elongated, thin-walled sleeve 44 having raised lands 46 at axially spaced locations therealong for engagement by bushings carried adjacent opposite ends of the openings through the aligned wheels and spacers. In the specific disclosed embodiment, a pair of bushings 48 and 50 are disposed in counterbores in the aft face of the 1-2 spacer 28 and the counterbore of the forward face of wheel 14. The bushings of the wheels and spacers aft of the illustrated bushings are retained by other mean, not part of this invention, although it will be appreciated that where bushings are employed, the retention system hereof may be utilized.

Referring now to FIG. 2, there is illustrated the forward-most bushing 48 disposed in a counterbore 54 in the aft face of the spacer 28 and the opening 56 through spacer 28 which receives the forward end of the return tube 42. A spoolie 58 is also illustrated in connection with the forward end of tube 42 for directing return steam from the first and second-stage buckets into the return tube 42.

From a review of drawing FIG. 2, it will be appreciated that the bushing on its annular forward face abuts a shoulder 60 forming the base of counterbore 54. To preclude dislodgement of the bushing 48 in an aft direction, a retention ring 62 is provided for substantially preventing axial movement of bushing 48 in that direction. The retention ring 62 is disposed in an annular groove 64 formed at a location in the counterbore 54 closely adjacent the aft end face of the bushing 48. With the retention ring 62 disposed in the groove 64 and projecting radially inwardly in axial registration with the aft end face of the bushing, the bushing is retained against axial movement.

Figure 5:
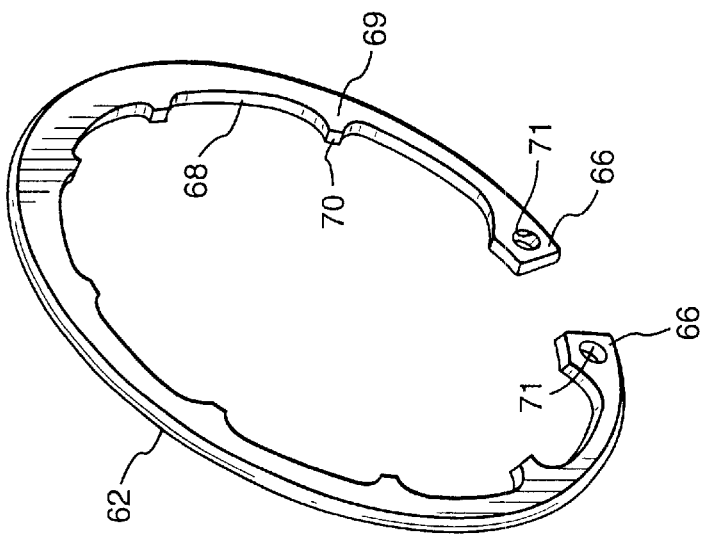
FIG. 5 is a perspective view of the retaining ring of FIG. 3.
Figure 4:
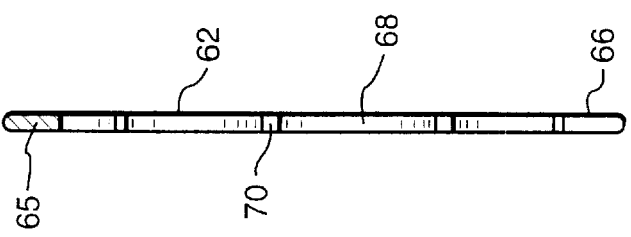
FIG. 4 is a cross-sectional view thereof taken generally about on line 4—4 in FIG. 3.
Figure 3:
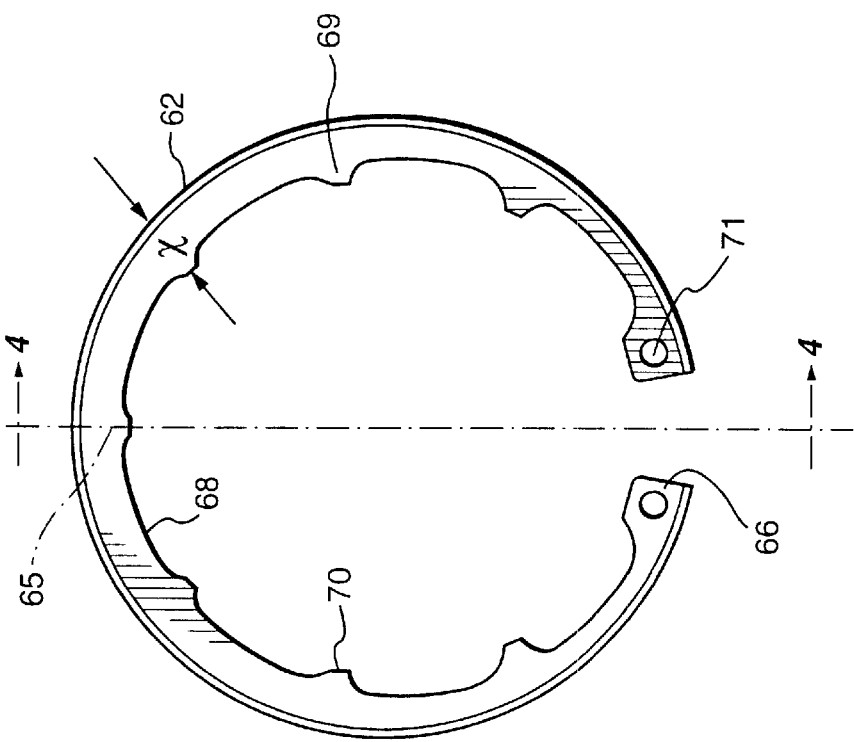
FIG. 3 is an end elevational view of a retainer ring forming part of the axial retention system hereof.

Referring to FIGS. 3–5, the retaining ring 62 comprises a split ring having a circumferential extent terminating in closely spaced, circumferentially opposed ends 66. From a review of FIG. 3, it will be seen that the width of the ring in a radial direction (with the exception of tabs 69 described below) decreases in opposite directions from a medial location 65 along the ring toward the ends 66 of the ring. Particularly, the inner diameter 68 of the ring increases in a direction toward the ends 66 such that the maximum thickness in a radial direction of the ring lies substantially 180° from the ends 66 and the minimum thickness lies adjacent ends 66.

To provide support for the rings 62 from the lands of the tube, a plurality of circumferentially spaced, radially inwardly directed tabs 69 are provided along the interior surface of the ring. The inner faces 70 of the tabs 69 are preferably arranged on a constant inner diameter of the ring and are preferably curved or arcuate to correspond to the curvature of the tube land. Thus, the distance x (FIG. 3) between the faces 70 of the tabs 69 and the outer diameter of the ring are substantially identical.

As a consequence of this construction, the ring ends 66 may be engaged in their illustrated openings 71 by a suitable tool and the outer diameter of the ring reduced such that the ring can be inserted into the groove 64 to retain the bushing against axial displacement. When the rotor is operating in the high centrifugal field and each ring is therefore subject to high centrifugal forces, the tabs 69 engage the land of the associated tube. The ring is thus supported by the tube land for retention in the groove 64. Additionally, because of the radially upwardly projecting tabs, the retaining ring is retained in the groove for all orientations of the ring about the groove. That is, the ring may rotate within the groove when subjected to certain forces. The circular orientation of the ring in the groove, however, does not affect its ability to retain the bushing in its counterbore or to be retained in the groove 64.

While the invention has been described in connection with what is presently considered to be the most practical and preferred embodiment, it is, to be understood that the invention is not to be limited to the disclosed embodiment, but on the contrary, is intended to cover various modifications and equivalent arrangements included within the spirit and scope of the appended claims.

What is claimed is:

1. A bushing retention system in a gas turbine, comprising:
   a gas turbine rotor having a plurality of axially aligned wheels and spacers, a plurality of axially aligned openings through said wheels and spacers with one of said wheels and spacers having counterbores in said openings;
   a plurality of tubes extending through said openings in said wheels and spacers at circumferentially spaced locations about said rotor for flowing a thermal medium;
   each said counterbore having a radial extending groove thereabout;
   a bushing in each said counterbore of said one of said wheels and spacers for supporting each said respective tube therein;
   a retainer ring in each said counterbore groove and projecting radially inwardly sufficiently to prevent movement of each said respective bushing in one axial direction, each ring having a circumferential extent terminating in ends spaced from one another enabling reduction of the outer diameter of said ring to locate each ring in each said respective groove;
   each said ring having radial inward tabs for engaging each respective tube when each said ring is subject to substantial centrifugal forces upon rotation of the rotor to maintain each ring within each respective groove and prevent axial displacement of the bushing in said one axial direction.

2. A system according to claim 1 wherein said tabs have arcuate, radially inwardly directed faces substantially corresponding to the curvature of the tubes.

3. A system according to claim 1 wherein each said ring has an increasing inner diameter thereabout between said tabs in a direction toward said ring ends.

4. A system according to claim 3 wherein the distances between radially inwardly directed faces of said tabs and an outer diameter of said ring at each location of a tab are substantially identical.

5. A system according to claim 1 wherein said tabs are circumferentially spaced one from the other about said ring and said ring has a thickness in a radial direction between said tabs decreasing toward the ends of said ring.

6. A system according to claim 5 wherein the distances between radially inwardly directed faces of said tabs and an outer diameter of said ring at each location of a tab are substantially identical.

7. A system according to claim 6 wherein said tabs have arcuate, radially inwardly directed faces substantially corresponding to the curvature of the tubes.

8. A bushing retention system in a gas turbine, comprising:

a gas turbine rotor having a plurality of axially aligned wheels and spacers, a plurality of axially aligned openings through said wheels and spacers;

a plurality of tubes extending through said openings in said wheels and spacers at circumferentially spaced locations about said rotor for flowing a thermal medium;

each said openings through one of said wheels and spacers having a radial extending groove thereabout;

a bushing in each said groove of said one of said wheels and spacers for supporting each said respective tube therein;

a retainer ring in each said groove and projecting radially inwardly sufficiently to prevent movement of each said respective bushing in one axial direction, each ring having a circumferential extent terminating in ends spaced from one another enabling reduction of the outer diameter of said ring to locate each ring in each said respective groove;

each said ring having radial inward tabs for engaging each respective tube when each said ring is subject to substantial centrifugal forces upon rotation of the rotor to maintain each ring within each respective groove and prevent axial displacement of each respective bushing in said one axial direction.

9. A system according to claim 8 wherein said tabs have arcuate, radially inwardly directed faces substantially corresponding to the curvature of the tubes.

10. A system according to claim 8 wherein each said ring has an increasing inner diameter thereabout between said tabs in a direction toward said ring ends.

11. A system according to claim 10 wherein the distances between radially inwardly directed faces of said tabs and an outer diameter of said ring at each location of a tab are substantially identical.

12. A system according to claim 8 wherein said tabs are circumferentially spaced one from the other about said ring and said ring has a thickness in a radial direction between said tabs decreasing toward the ends of said ring.

13. A system according to claim 12 wherein the distances between radially inwardly directed faces of said tabs and an outer diameter of said ring at each location of a tab are substantially identical.

14. A system according to claim 13 wherein said tabs have arcuate, radially inwardly directed faces substantially corresponding to the curvature of the tubes.

* * * * *